(12) United States Patent
Tanaka

(10) Patent No.: US 10,041,790 B2
(45) Date of Patent: Aug. 7, 2018

(54) MISALIGNMENT CALCULATION SYSTEM

(71) Applicant: NIPPON STEEL & SUMITOMO METAL CORPORATION, Tokyo (JP)

(72) Inventor: Masaki Tanaka, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 994 days.

(21) Appl. No.: 14/381,261

(22) PCT Filed: Nov. 13, 2012

(86) PCT No.: PCT/JP2012/007272
§ 371 (c)(1),
(2) Date: Aug. 27, 2014

(87) PCT Pub. No.: WO2013/132561
PCT Pub. Date: Sep. 12, 2013

(65) Prior Publication Data
US 2015/0094979 A1   Apr. 2, 2015

(30) Foreign Application Priority Data
Mar. 7, 2012  (JP) .................................. 2012-050347

(51) Int. Cl.
*G01B 21/22* (2006.01)
*B23K 37/053* (2006.01)
(Continued)

(52) U.S. Cl.
CPC ............ *G01B 21/22* (2013.01); *B23K 31/027* (2013.01); *B23K 37/053* (2013.01); *B23K 2201/10* (2013.01); *B23K 2203/04* (2013.01)

(58) Field of Classification Search
None
See application file for complete search history.

(56) References Cited

U.S. PATENT DOCUMENTS 4,089,455 A * 5/1978 Fellers ................. B23K 31/027
138/97
4,840,303 A * 6/1989 Fujii ..................... B23K 26/26
219/121.63

(Continued)

FOREIGN PATENT DOCUMENTS

| JP | 2006-281217 | 10/2006 | |
| JP | 2010017731 A * | 1/2010 | |
| WO | WO 2006112689 A1 * | 10/2006 | ......... B23K 37/0533 |

*Primary Examiner* — Alexander Satanovsky
*Assistant Examiner* — Lina Cordero
(74) *Attorney, Agent, or Firm* — Clark & Brody

(57) ABSTRACT

A misalignment calculation system comprising a misalignment calculator for calculating a misalignment occurring in butt welding of end portions of a first steel pipe and a second steel pipe by using profile data measured in a circumferential direction on the first steel pipe end portion by presetting a first angle datum, and profile data measured in a circumferential direction on the second steel pipe end portion by presetting a second angle datum. The misalignment calculator calculates the misalignment amount in a state in which an angle formed between the first and second angle datums is adjusted to an input angle and in which the center of profile data showing an external surface geometry at the first steel pipe end portion is aligned with the center of the profile data showing an external surface geometry at an end portion of the second steel pipe so that misalignment can be evaluated.

14 Claims, 3 Drawing Sheets

(51) Int. Cl.
*B23K 31/02* (2006.01)
*B23K 103/04* (2006.01)
*B23K 101/10* (2006.01)

(56) References Cited

U.S. PATENT DOCUMENTS

| | | | | |
|---|---|---|---|---|
| 4,854,493 A | * | 8/1989 | Fujii | B23K 26/26 228/13 |
| 6,694,634 B2 | * | 2/2004 | Sato | B23Q 17/24 33/503 |
| 2010/0241394 A1 | * | 9/2010 | Ihara | G01B 21/24 702/151 |

* cited by examiner

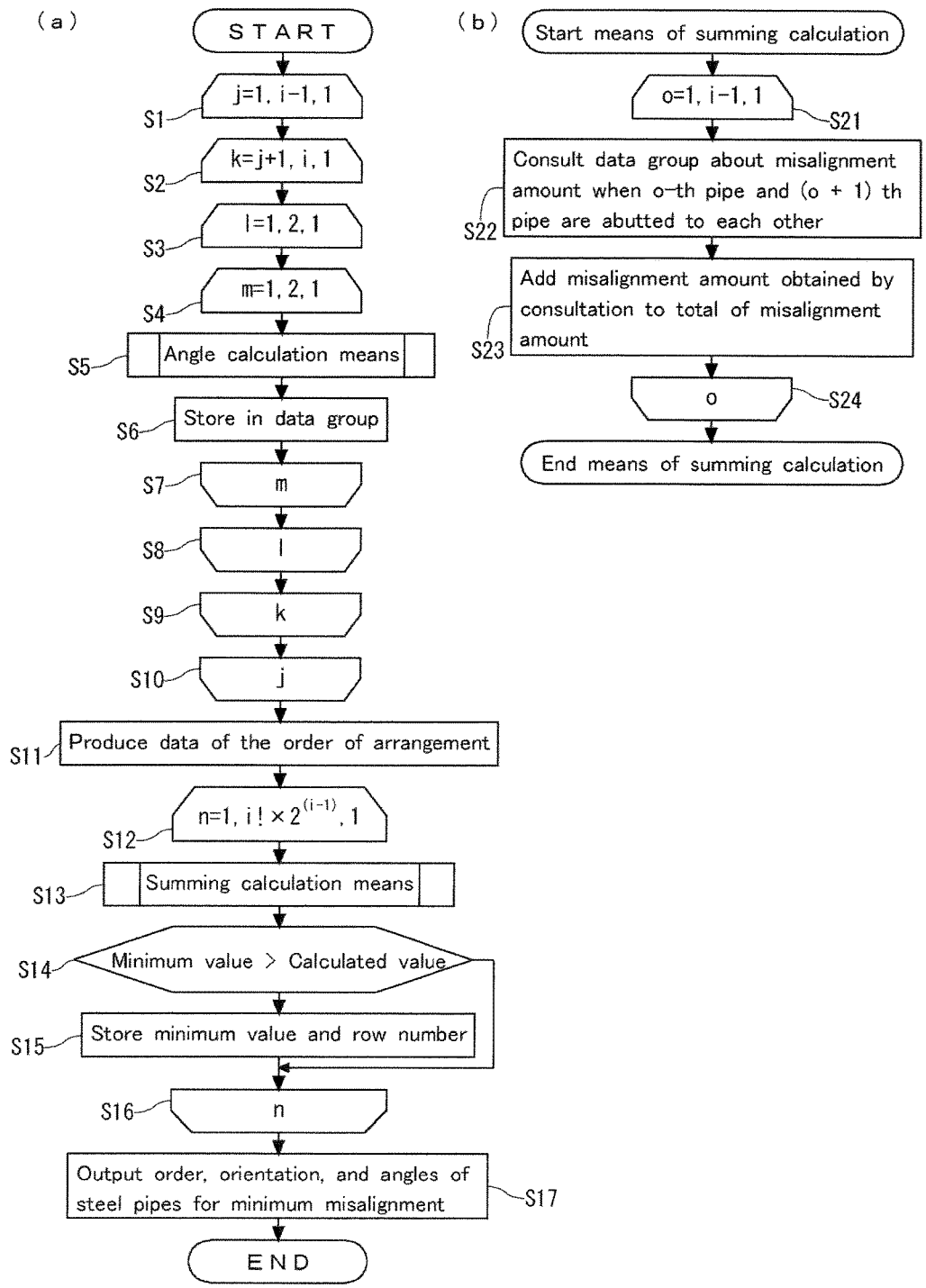

MISALIGNMENT CALCULATION SYSTEM

TECHNICAL FIELD

The present invention relates to a misalignment calculation system for calculating a misalignment occurring when welding two steel pipes with their end faces being abutted against each other. To be specific, the present invention relates to a misalignment calculation system which can quantify and evaluate the misalignment occurring when performing butt welding.

Note that, unless otherwise stated, the definition of term in the present description is as follows.

"Misalignment" means: a deviation/difference that occurs between the end-portion external surface geometries of a first steel pipe and a second steel pipe; and a deviation/difference that occurs between the end-portion internal surface geometries of a first steel pipe and a second steel pipe, when end portions of a first steel pipe and a second steel pipe are abutted together.

BACKGROUND ART

Pipelines for transmitting petroleum and natural gas, etc. are laid after making a jointed pipe by welding steel pipes with their end faces being abutted against each other. In such a case, it often happens that the external and internal surface geometries of an end portion of one steel pipe may not completely match with the external and internal surface geometries of an end portion of the other steel pipe so that deviation, that is, misalignment occurs. Such misalignment is caused by the variations within a tolerable range of quality standard with respect to outer diameter, inner diameter, and wall thickness in a circumferential direction at an end portion of a steel pipe produced under specific Quality Standard. Moreover, the misalignment is also caused by the ovalizing of the external and/or internal surface geometries and the eccentricity of the wall thickness within the quality standard.

A large misalignment at a weld zone which is butt welded may cause a failure originated from a weld zone in a pipeline. To minimize the risk of failure, it is necessary to limit the misalignment to a minimum. However, the misalignment occurring when two steel pipes are welded with their end portions faces being butted against each other is typically checked only by visual inspection.

Regarding the misalignment occurring when performing butt welding, various proposals have been made in the past, which includes Patent Literature 1, for example. Patent Literature 1 has its objective to prevent the occurrence of buckling in a jointed pipe attributable to misalignment etc. when bending and winding up the butt welded jointed pipe on a drum in the laying of a pipeline by a reel purge method. Patent Literature 1 proposes the preparation of steel pipes as the first and second steel pipes which are to be butt welded, in which the outer diameter difference, the inner diameter difference, and the yield strength difference at their end portions satisfy a predetermined relational formula. It is reported that this allows the suppression of occurrence of external surface misalignment, internal surface misalignment, and buckling attributable to the strength.

CITATION LIST

Patent Literature

Patent Literature 1: Japanese Patent Application Publication No. 2006-281217

SUMMARY OF INVENTION

Technical Problem

As described so far, while it is required to minimize the misalignment when welding steel pipes with their end faces being abutted against each other, the misalignment is typically checked only be visual inspection. Therefore, there is a need of evaluating by quantifying the misalignment and further minimizing the misalignment thereby reducing the risk of failure.

In the above described Patent Literature 1, misalignment is controlled by preparing a steel pipe of which an outer diameter difference and an inner diameter difference satisfy a predetermined formula. However, even if the steel pipes of the same outer diameter and inner diameter are prepared, the external surface geometry or the internal surface geometry of steel pipe may deform due to ovalizing etc. thereby resulting in a misalignment. Therefore, even when preparing a steel pipe in which the outer diameter difference and the inner diameter difference satisfy a predetermined relational formula, there is a need to quantify and evaluate the misalignment and further to minimize the misalignment thereby reducing the risk of failure.

The present invention has been made in view of such circumstances, and has its objective to provide a misalignment calculation system which can quantify and evaluate the misalignment occurring when performing butt welding.

Solution to Problem

The summaries of the present invention are as follows.

(1) A misalignment calculation system comprising a misalignment calculator for calculating a misalignment amount occurring in butt welding of end portions of a first steel pipe and a second steel pipe by using profile data measured in a circumferential direction on the end portion of the first steel pipe by presetting a first angle datum, and profile data measured in a circumferential direction on the end portion of the second steel pipe by presetting a second angle datum, wherein the misalignment calculator calculates the misalignment amount in a state in which an angle formed between the first angle datum and the second angle datum is adjusted to an input angle, and in which the center of profile data showing an external surface geometry at the end portion of the first steel pipe is aligned with the center of the profile data showing an external surface geometry at the end portion of the second steel pipe.

(2) A misalignment calculation system comprising a misalignment calculator for calculating a misalignment amount occurring in butt welding of end portions of a first steel pipe and a second steel pipe by using profile data measured in a circumferential direction on the end portion of the first steel pipe by presetting a first angle datum, and profile data measured in a circumferential direction on the end portion of the second steel pipe by presetting a second angle datum, wherein the misalignment calculator calculates the misalignment amount in a state in which an angle formed between the first angle datum and the second angle datum is adjusted to an input angle, and in which the center of profile data showing an internal surface geometry at the end portion of the first steel pipe is aligned with the center of the profile data showing an internal surface geometry at the end portion of the second steel pipe.

(3) A misalignment calculation system comprising a misalignment calculator for calculating a misalignment amount occurring in butt welding of end portions of a first steel pipe and a second steel pipe by using profile data measured in a circumferential direction on the end portion of the first steel pipe by presetting a first angle datum, and profile data measured in a circumferential direction on the end portion of the second steel pipe by presetting a second angle datum, wherein the misalignment calculator rotates the profile data of the end portion of the first steel pipe by a first angle as an input and rotates the profile data of the end portion of the second steel pipe by a second angle as an input, and calculates the misalignment amount in a state in which a bottom position of profile data showing an external surface geometry at the end portion of the first steel pipe is aligned with a bottom position of profile data showing an external surface geometry at the end portion of the second steel pipe.

(4) The misalignment calculation system according to the above described (1) or (2) further comprising an angle calculator for calculating a misalignment amount at each input angle that is varied by a predetermined amount of change by using the misalignment calculator, and determining an angle at which the misalignment amount becomes minimum.

(5) The misalignment calculation system according to the above described (3) further comprising an angle calculator that varies the first angle by a predetermined third angle each time, while at each first angle thus varied, the second angle being varied by a predetermined fourth angle each time, and calculates the misalignment amount at each change of angle by using the misalignment calculator to determine the first angle and the second angle at which the misalignment amount becomes minimum.

(6) The misalignment calculation system according to the above described (1) to (5), wherein the misalignment amount is calculated by using the profile data indicating the internal surface geometry at an end portion of the first steel pipe and the profile data indicating the internal surface geometry at an end portion of the second steel pipe, and the profile data indicating the external surface geometry of an end portion of the first steel pipe and the profile data indicating the external surface geometry of an end portion of the second steel pipe, and wherein the misalignment amount is defined by one of the items according to the following (a), (b), and (c):

(a) An area of a noncontact portion when abutted together,
(b) A maximum value of a radial length of the noncontact portion when abutted together, and
(c) A proportion occupied by the area of a noncontact portion when abutted together with respect to the area of an end portion of the first steel pipe or the area of an end portion of the second steel pipe.

(7) The misalignment calculation system according to the above described (1) to (5), wherein the misalignment amount is calculated by using the profile data indicating the internal surface geometry at an end portion of the first steel pipe and profile data indicating the internal surface geometry at an end portion of the second steel pipe, and is defined by one of the items according to the following (d), (e), and (f):

(d) An area of an internal surface side region of the noncontact portion when abutted together,
(e) A maximum value of the radial length of the internal surface side region of the noncontact portion when abutted together, and
(f) A proportion occupied by the area of an internal surface side region of the noncontact portion when abutted together with respect to the area of an end portion of the first steel pipe or the area of an end portion of the second steel pipe.

(8) The misalignment calculation system according to the above described (1) to (5), wherein the misalignment amount is calculated by using profile data indicating the external surface geometry at an end portion of the first steel pipe and profile data indicating the external surface geometry at an end portion of the second steel pipe, and is defined by one of the items according to the following (g), (h), and (i):

(g) An area of an external surface side region of the noncontact portion when abutted together,
(h) A maximum value of the radial length of the external surface side region of the noncontact portion when abutted together, and
(i) A proportion occupied by the area of an external surface side region of the noncontact portion when abutted together with respect to the area of an end portion of the first steel pipe or the area of an end portion of the second steel pipe.

(9) The misalignment calculation system according to any of the above described (4) to (8) further comprising a data generator that generates a misalignment data group by performing processing to determine angle data at which the misalignment amount becomes minimum and the misalignment amount at that angle data by using the angle calculator for all the combinations when selecting two steel pipes from a group consisting of a plurality of steel pipes to make them abutted; a summing calculator for calculating the total value of each misalignment amount for each abutted part when abutting a plurality of steel pipes, in the order of input for calculation and in pipe-end orientation by using the misalignment data group; and a computing unit that calculates the total of the misalignment amounts by using the summing calculator for all the combinations with respect to order and orientation when abutting steel pipes in the group one after another to form jointed pipes and determines the order, the orientation and the angle data at which the total of the misalignment amounts becomes minimum.

(10) The misalignment calculation system according to any of the above described (1) to (3) further comprising a judging unit that judges pass or fail by using a threshold value set for the misalignment amount calculated by using the misalignment calculator.

In the present invention, the term "angle data" refers to an angle (the angle formed by a first angle datum and a second angle datum) at which misalignment amount becomes minimum in the embodiment of the above described (1) in which the centers of the external surface geometries are aligned and in the embodiment of the above described (2) in which the centers of the internal surface geometries are aligned, and to a first angle and a second angle at which misalignment amount becomes minimum in the embodiment of the above described (3) in which the bottom positions of the external surface geometries are aligned.

Advantageous Effects of Invention

The misalignment calculation system of the present invention has the following remarkable advantages.

(1) It is possible to quantify and evaluate the misalignment occurring when performing butt welding for end portions of steel pipes, and
(2) It is possible to determine an angle at which the misalignment becomes minimum according to the above described (1).

BRIEF DESCRIPTION OF DRAWINGS

FIG. 1 explains an example of the procedure to calculate a misalignment amount by a misalignment calculator, in which FIG. 1(a) shows the procedure to interpolate a profile data of a first steel pipe, FIG. 1(b) the procedure to interpolate a profile data of a second steel pipe, FIG. 1(c) the procedure to in a parallel fashion translate a pictorial figure made by interpolation for the first steel pipe, FIG. 1(d) the procedure to in a parallel fashion translate a pictorial figure made by interpolation for the second steel pipe, FIG. 1(e) the procedure to rotationally move a pictorial figure made by interpolation for the first steel pipe, and FIG. 1(f) the procedure to rotationally move a pictorial figure made by interpolation for the second steel pipe, respectively.

FIG. 3 is a flowchart representing a processing example of a system, which is an embodiment of the misalignment calculation system of the present invention, for computing order, orientation, and an angle data of steel pipes to minimize the total of the misalignment amounts in jointed pipes, in which FIG. 3(a) shows a main routine, and FIG. 3(b) shows a summing calculator.

DESCRIPTION OF EMBODIMENTS

1. Misalignment Calculator

Figure 1:
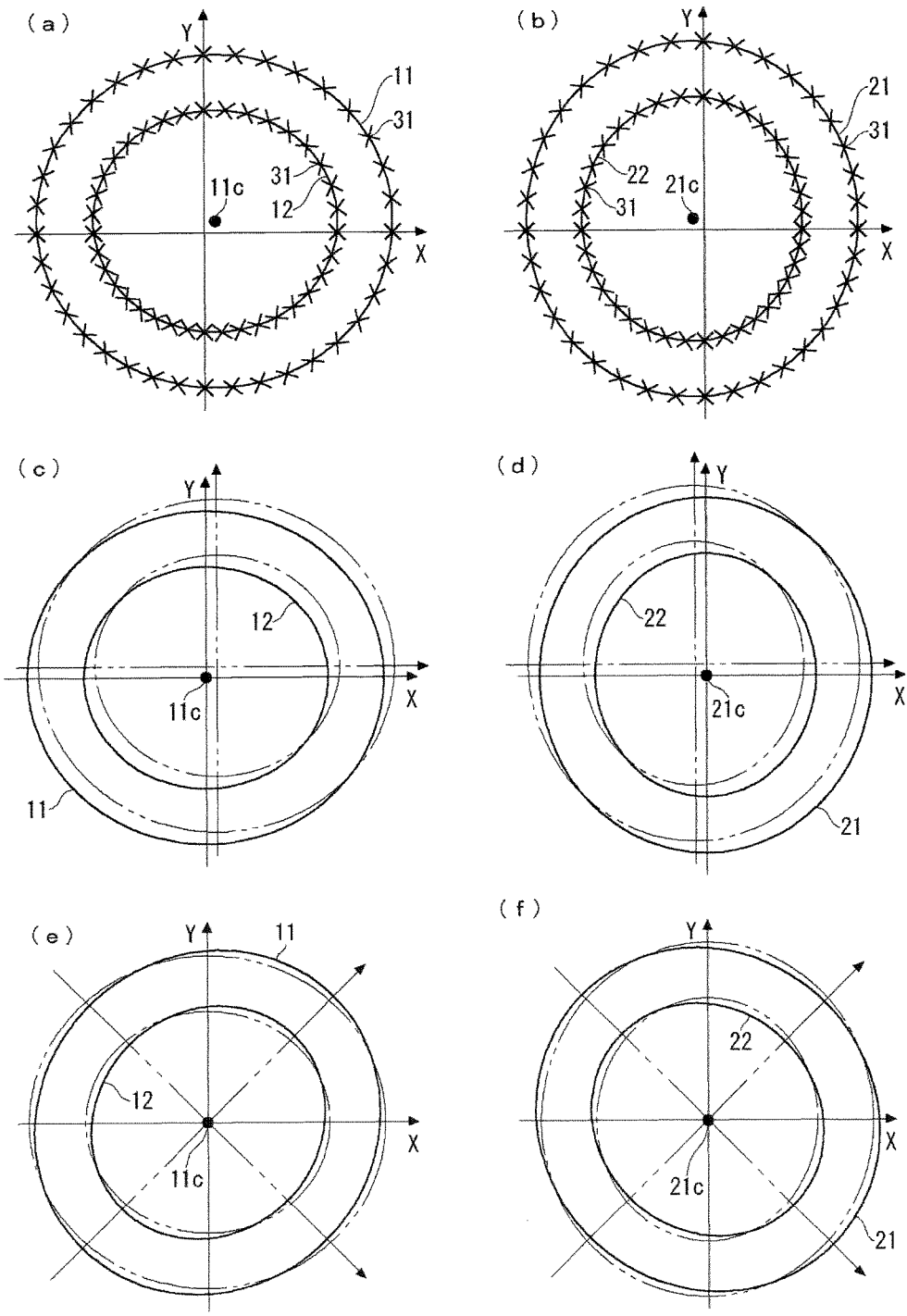

The misalignment calculation system of the present invention comprises a misalignment calculator for calculating a misalignment amount upon butt welding of end portions of a first steel pipe and a second steel pipe. The misalignment calculator calculates a misalignment amount by using profile data indicating either one or both of the internal surface geometry and the external surface geometry at an end portion of a steel pipe. This is because to minimize the misalignment, only taking into consideration of the outer diameter or inner diameter of the steel pipe is not enough, and the deformation of the external surface geometry or internal surface geometry of the steel pipe due to ovalizing etc. needs to be taken into consideration.

The profile data is point group data indicating either one or both of the outer surface geometry and internal surface geometry in a circumferential direction at an end portion of the steel pipe. As the point group data, for example, point group data which is made up of a plurality of measurement points which are represented by an angle (θ) and a distance (r) from the measurement center at the angle can be used. To be specific, profile data in which angular interval between adjacent measurement points is 1° can be used.

The profile data can be measured by a shape measurement instrument. When creating profile data by measurement, an angle datum (datum as θ=0°) is set. Moreover, in order to easily identify the angle datum of the steel pipe at the time of butt welding, it is preferable that the position of the angle datum (the position at which θ=0°) be marked at an end portion of the steel pipe.

When actually butt welding end portions of steel pipes, a method of aligning the centers of external surface geometries of the first and second steel pipes, a method of aligning the centers of internal surface geometries of the first and second steel pipes, and a method of aligning the bottom positions of external surface geometries of the first and second steel pipes are often used. Therefore, the misalignment calculator included in the misalignment calculation system of the present invention can adopt an embodiment in which the centers of the external surface geometries are aligned to each other, an embodiment in which the centers of the internal surface geometry are aligned to each other, or an embodiment in which the bottom positions of the external surface geometries are aligned to each other.

In the embodiment in which the centers of external surface geometries are aligned to each other, the misalignment calculator calculates a misalignment amount in a state in which an angle formed between the angle datum of the first steel pipe and the angle datum of the second steel pipe is adjusted to as an input angle, and in which the center of the profile data indicating the external surface geometry at an end portion of the first steel pipe is aligned with the center of the profile data indicating the external surface geometry at an end portion of the second steel pipe.

Here, the misalignment amount when an end portion of the first steel pipe and an end portion of the second steel pipe are abutted to be welded varies depending on angular positions about the axial centerline of the first steel pipe and angular positions about the axial center line of the second steel pipe. For this reason, it is preferable that the misalignment calculator can be input with a first angle as variable by which the profile data of an end portion of the first steel pipe is rotated, and with a second angle as variable by which the profile data of an end portion of the second steel pipe is rotated.

However, in an embodiment in which the centers of external surface geometries are aligned to each other, when the angle formed by the angular position of the angle datum of the first steel pipe and the angular position of the angle datum of the second steel pipe is the same, the misalignment amount becomes the same value regardless of the first angle and the second angle. For this reason, in the present embodiment, it is sufficient that the angle formed by the angle datum of the first steel pipe and the angle datum of the second steel pipe can be input as variable. For example, it is also possible to adopt a method in which a first angle and a second angle are input to determine an angle formed by the angular position of the angle datum of the first steel pipe and the angular position of the angle datum of the second steel pipe from those input first and second angles, and the value of the determined angle is input to the misalignment calculator.

Moreover, in an embodiment in which the centers of internal surface geometries are aligned to each other, the misalignment calculator calculates the misalignment amount in a state in which the angle formed by the angle datum of the first steel pipe and the angle datum of the second steel pipe is adjusted to as an input angle, and in which the center of the profile data indicating the internal surface geometry at an end portion of the first steel pipe and the center of the profile data indicating the internal surface geometry at an end portion of the second steel pipe are aligned. In this embodiment as well, if the angle formed by the angle datum of the first steel pipe and the angle datum of the second steel pipe remains the same, the misalignment amount will become the same. Therefore, it is sufficient that the angle formed by the angle datum of the first steel pipe and the angle datum of the second steel pipe can be input as variable. For example, it is also possible to adopt a method in which a first angle and a second angle are input to determine an angle formed by the angular position of the angle datum of the first steel pipe and the angular position of the angle datum of the second steel pipe from the input first angle and second angle, and the value of the determined angle is input to the misalignment calculator.

In an embodiment in which the bottom positions of external surface geometries for two steel pipes are aligned to each other, the misalignment calculator calculates the misalignment amount in a state in which the profile data of an end portion of the first steel pipe is rotated by a first angle as input, and the profile data of an end portion of the second steel pipe is rotated by a second angle as input, and the bottom position of the profile data indicating the external surface geometry of an end portion of the first steel pipe and the bottom position of the profile data indicating the external surface geometry of an end portion of the second steel pipe are aligned to each other.

In this embodiment, even if the angle formed by the angular position of the angle datum of the first steel pipe and the angular position of the angle datum of the second steel pipe remains the same, the misalignment amount varies depending on the first angle and the second angle. Here, the bottom position refers to a position at which a steel pipe is brought into contact with the ground when the steel pipe is placed on a flat plane, and the alignment of bottom positions means that the same values are set for the r value at $\theta=270°$ relative to the X-axis in the procedure to be described with reference to the following FIGS. 1 and 2.

An example of the procedure to calculate a misalignment amount by a misalignment calculator which can adopt the above described embodiments will be described while referring to the below described FIGS. 1 and 2.

FIG. 1 explains an example of the procedure to calculate a misalignment amount by a misalignment calculator, in which FIG. 1(a) shows the procedure to interpolate a profile data of a first steel pipe, FIG. 1(b) the procedure to interpolate a profile data of a second steel pipe, FIG. 1(c) the procedure to in a parallel fashion translate a pictorial figure made by interpolation for the first steel pipe, FIG. 1(d) the procedure to in a parallel fashion translate a pictorial figure made by interpolation for the second steel pipe, FIG. 1(e) the procedure to rotationally move a pictorial figure made by interpolation for the first steel pipe, and FIG. 1(f) the procedure to rotationally move a pictorial figure made by interpolation for the second steel pipe, respectively.

The procedure to be described by using FIG. 1 is a procedure to rotate the profile data of an end portion of the first steel pipe by a first angle as input, and rotate the profile data of an end portion of the second steel pipe by a second angle as input.

First, each space between adjacent measurement points is interpolated for the profile data to be used for the calculation of the misalignment amount among two sets of profile data indicating the external surface geometry and the internal surface geometry for the first steel pipe. The interpolation can be performed by a well-known method such as, for example, a linear interpolation, a spline interpolation, a Bezier interpolation, and a clothoid interpolation. FIG. 1(a) shows a pictorial figure 11 that represents an end-portion external surface geometry of the first steel pipe, and a pictorial figure 12 that represents an end-portion internal surface geometry thereof. These pictorial figures have been obtained by Bezier interpolation for spaces between adjacent points in measurements 31 of each set of profile data indicating the end-portion external surface geometry or the end-portion internal surface geometry of the first steel pipe.

As with the case of the first steel pipe, spaces between adjacent measurement points are interpolated for the profile data to be used for the calculation of the misalignment amount among two sets of profile data indicating the end-portion external surface geometry and the end-portion internal surface geometry in the second steel pipe. FIG. 1(b) shows a pictorial figure 21 that represents the end-portion external surface geometry of the second steel pipe, and a pictorial figure 22 that represents the end-portion internal surface geometry thereof. These pictorial figures have been obtained by Bezier interpolation for spaces between adjacent points in measurements 31 of each of profile data indicating the end-portion external surface geometry or the end-portion internal surface geometry of the second steel pipe.

The pictorial figure that represents the end portion geometry of the first steel pipe obtained by interpolation (a polygon in the case of a liner interpolation, and a closed curve in the case of a spline interpolation, etc.) is in a parallel fashion translated such that the center of the end-portion external surface geometry or the center of the end-portion internal surface geometry is positioned at the origin of polar coordinates. In FIG. 1(c), a pictorial figure 11 that represents the end-portion external surface geometry and a pictorial figure 12 that represents the end-portion internal surface geometry of the first steel pipe, of which the center of the end-portion external surface geometry is positioned at the origin of polar coordinates by means of parallel translation, are shown by solid lines, and the pictorial figure that represents the end-portion external surface geometry and the end-portion internal surface geometry of the first steel pipe before parallel translation are shown by imaginary lines, respectively. Here, the center of the end-portion external surface geometry and the center of the end-portion internal surface geometry are obtained by determining a best-fit circle defined as an approximate circle for the profile data, and calculating the center thereof. The approximate circle is obtained by a known method such as a least square method. FIG. 1(c) shows the center 11c of the end-portion external surface geometry of the first steel pipe by a solid circle.

As with case of the first steel pipe, a pictorial figure that represents the end portion geometry of the second steel pipe obtained by interpolation is in a parallel fashion translated such that the center of the end-portion external surface geometry or the center of the end-portion internal surface geometry is positioned at the origin of polar coordinates. In FIG. 1(d), a pictorial figure 21 that represents the end-portion external surface geometry and a pictorial figure 22 that represents the end-portion internal surface geometry of the second steel pipe, of which the center of the end-portion external surface geometry is positioned at the origin of polar coordinates by means of parallel translation, are shown by solid lines, and a pictorial figure that represents the end-portion external surface geometry and the end-portion internal surface geometry of the second steel pipe before parallel translation are shown by imaginary lines, respectively. Moreover, the center 21c of the end-portion external surface geometry of the second steel pipe is shown by a black solid circle.

The pictorial figure that represents the end portion geometry of the first steel pipe which has been in a parallel fashion translated is rotationally moved by a first angle by coordinate transformation. In FIG. 1(e), the pictorial figure 11 that represents the end-portion external surface geometry of the first steel pipe and the pictorial figure 12 that represents the end-portion internal surface geometry, which have been rotationally moved by a first angle, are shown by solid lines, and the pictorial figures that represent the end-portion external surface geometry and the end-portion internal surface geometry of the first steel pipe before rotational movement are shown by imaginary lines, respectively.

As with the case of the first steel pipe, the pictorial figure that represents the end portion geometry of the second steel pipe which has been in a parallel fashion translated is rotationally moved by a second angle by coordinate transformation. In FIG. 1(f), the pictorial figure 21 that represents the end-portion external surface geometry of the second steel pipe and the pictorial figure 22 that represents the end-portion internal surface geometry, which have been rotationally moved by a second angle, are shown by solid lines, and the pictorial figures that represent the end-portion external surface geometry and the end-portion internal surface geometry of the second steel pipe before rotational movement are shown by imaginary lines, respectively.

Thus obtained pictorial figures that represent the end portion geometries of the first steel pipe and the second steel pipe are used to calculate a misalignment amount. The procedure which has been described by using FIG. 1 is a procedure to rotate the profile data of an end portion of the first steel pipe by a first angle as input, and to rotate the profile data of an end portion of the second steel pipe by a second angle as input, and can be applied as it is to the embodiment in which the bottom positions of external surface geometries are aligned to each other.

Further, the above described procedure can be applied to an embodiment in which the centers of external surface geometries are aligned to each other, and an embodiment in which the centers of internal surface geometries are aligned to each other, if a part of the procedure shown in FIG. 1 is modified. To be specific, the procedure which has been described by using FIG. 1 may be carried out by letting a first angle be 0° and determining a second angle, for which the angle formed by the angle datum of the first steel pipe and the angle datum of the second steel pipe becomes an input angle, to use the first angle and the second angle. That is, the above described procedure may be carried out by letting the first angle be 0° and thereby substantially omitting the procedure to rotationally move the pictorial figure of the first steel pipe of FIG. 1(e).

Further, the procedure which has been described by using FIG. 1 may be carried out by letting the second angle be 0° and determining a first angle, for which the angle formed by the angle datum of the first steel pipe and the angle datum of the second steel pipe becomes an input angle, to use the first angle and the second angle. That is, the above described procedure may be carried by letting the second angle be 0° and thereby substantially omitting the procedure to rotationally move the pictorial figure of the second steel pipe of FIG. 1(f).

The misalignment amount is calculated by using thus obtained pictorial figures that represent the end portion geometries of the first and second steel pipes. To be specific, either one of the pictorial figures that represent the end portion geometries of the first and second steel pipes is reversed with Y axis being as the axis of symmetry (after mirror transformation with respect to Y axis), and the pictorial figure which has been reversed and the other pictorial figure which does not need the reverse processing are superposed.

However, in the embodiment in which the bottom positions of external surface geometries are aligned to each other, it is necessary that the pictorial figure that represents the end portion geometry of the first steel pipe or the second steel pipe which has been rotationally moved is in a parallel fashion translated so that a bottom position (r value when θ=270° relative to the X-axis) of the end-portion external surface geometry of the first steel pipe and a bottom position (r value when θ=270° relative to the X-axis) of the end-portion external surface geometry of the second steel pipe are aligned to each other, and that the procedure for superposing is performed.

The misalignment amount is calculated based on thus superposed pictorial figures. As the misalignment amount, for example, items of the above described (a) to (i) may be adopted. Each item will be described by using the following FIG. 2.

Figure 2:
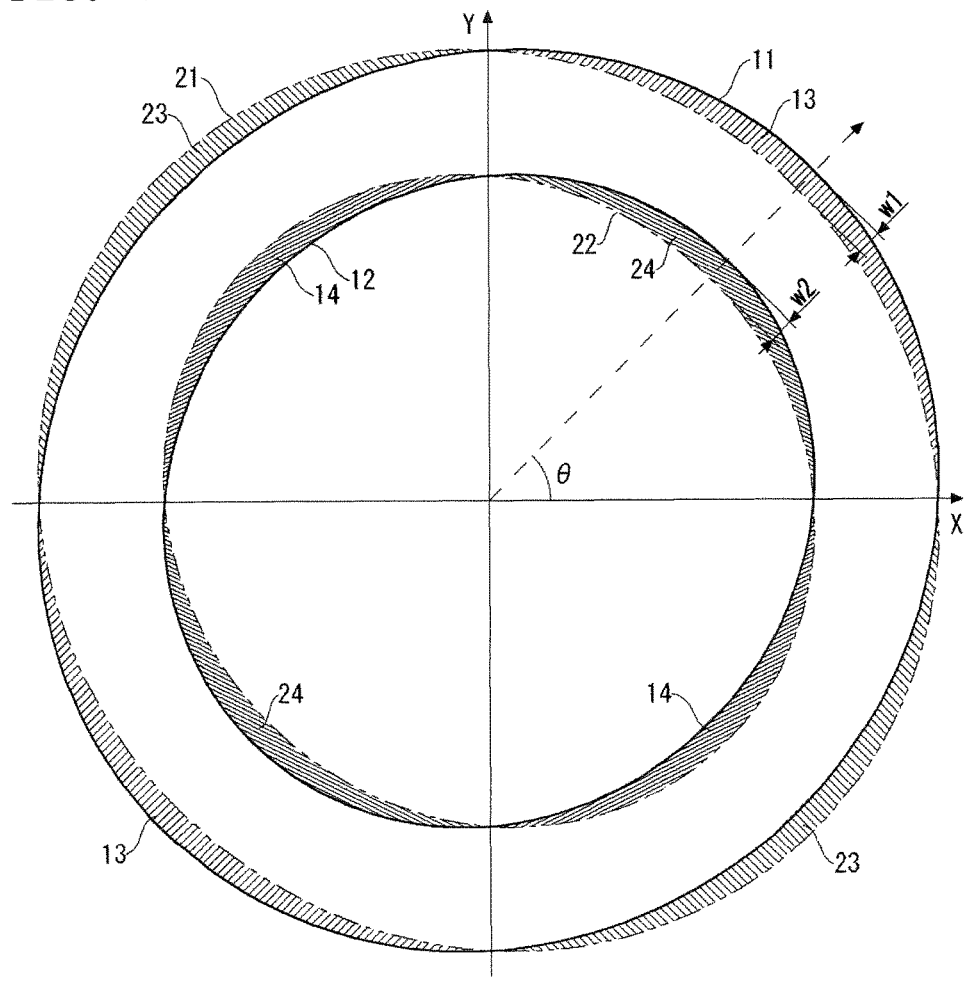
FIG. 2 is a diagram to explain a misalignment amount defined in the present invention.

FIG. 2 is a diagram to explain the misalignment amount defined in the present invention. In FIG. 2, a pictorial figure 11 that represents the end-portion external surface geometry of the first steel pipe and a pictorial figure 12 that represents the end-portion internal surface geometry (hereafter, also simply referred to as an "external surface geometry of the first steel pipe" and an "internal surface geometry of the first steel pipe") are shown by solid lines, and a pictorial figure 21 that represents the end-portion external surface geometry of the second steel pipe and a pictorial figure 22 that represents the end-portion internal surface geometry (hereafter, also simply referred to as an "external surface geometry of the second steel pipe" and an "internal surface geometry of the second steel pipe") are shown by two-dot chain lines, respectively. As shown in FIG. 2, the misalignment is made up of an external surface side noncontact region 13 and an internal surface side noncontact region 14 of the first steel pipe, and an external surface side noncontact region 23 and an internal surface side noncontact region 24 of the second steel pipe.

Here, the external surface side noncontact region 13 of the first steel pipe is a portion, which is not in contact with the second steel pipe, of the end face of the first steel pipe and is a region defined by the external surface geometry 11 of the first steel pipe and the external surface geometry 21 of the second steel pipe. Moreover, the internal surface side noncontact region 14 of the first steel pipe is a portion, which is not in contact with the second steel pipe, of the end face of the first steel pipe, and is a region defined by the internal surface geometry 12 of the first steel pipe and the internal surface geometry 22 of the second steel pipe. The external surface side noncontact region 23 of the second steel pipe is a portion, which is not in contact with the first steel pipe, of the end face of the second steel pipe and is a region defined by the external surface geometry 11 of the first steel pipe and the external surface geometry 21 of the second steel pipe. The external surface side noncontact region 24 of the second steel pipe is a portion, which is not in contact with the first steel pipe, of the end face of the second steel pipe, and is a region defined by the internal surface geometry 12 of the first steel pipe and the internal surface geometry 22 of the second steel pipe.

The area of a noncontact portion when abutted together according to the above described (a) is a value obtained by adding up the areas of the external surface side noncontact region 13 and the internal surface side noncontact region 14 of the first steel pipe, and the external surface side noncontact region 23 and the internal surface side noncontact region 24 of the second steel pipe. Moreover, the area of the internal surface side region of the noncontact portion when abutted together according to the above described (d) is a value obtained by adding up the areas of the internal surface side noncontact region 14 of the first steel pipe and the internal surface side noncontact region 24 of the second steel pipe. The area of an external surface side region of the noncontact portion when abutted together according to the above described (g) is a value obtained by adding up the areas of the external surface side noncontact region 13 of the first steel pipe and the external surface side noncontact region 23 of the second steel pipe.

The proportion occupied by the area of a noncontact portion when abutted together with respect to the area of an end portion of the first steel pipe or an end portion of the second steel pipe (hereafter, there are also generally referred to simply as "the end portion area of steel pipe") according to the above described (c) is a proportion occupied by the area of the above described (a) with respect to the end portion area of a steel pipe. Moreover, the proportion occupied by the area of an internal surface side region of the noncontact portion when abutted together with respect to the area of an end portion of the steel pipe according to the above described (f) is a proportion occupied by the area of the above described (d) with respect to the end portion area of a steel pipe. The proportion occupied by the area of an external surface side region of the portion which comes in noncontact when butted together with respect to the area of an end portion of a steel pipe according to the above described (i) is a proportion occupied by the area of the above described (g) with respect to the end portion area of the steel plate. Here, as the end portion area of a steel pipe, for example, an area calculated from profile data, area calculated from a nominal outer diameter and a nominal inner diameter, and an area calculated from an average outer diameter and an average inner diameter can be adopted.

The radial length of a noncontact portion when abutted together is made up of a length w1 of the noncontact portion of external surface side and a length w2 of the noncontact portion of internal surface side as shown in FIG. 2. Here, the length w1 of the noncontact portion of external surface side is a distance in a radial direction from the external surface geometry 11 of the first steel pipe to the external surface geometry 21 of the second steel pipe. Moreover, the length w2 of the noncontact portion of internal surface side is a distance in a radial direction from the internal surface geometry 21 of the first steel pipe to the internal surface geometry 12 of the second steel pipe.

The radial length of a noncontact portion when abutted together according to the above described (b) is a value obtained by adding up the length w1 of the noncontact portion of external surface side and the length w2 of the noncontact portion of internal surface side. The maximum value thereof is a maximum value when the radial length of a portion which comes in noncontact is determined for each predetermined angle from 0 to 360°. Moreover, the radial length of the internal surface side region of the noncontact portion when abutted together according to the above described (e) is the length w2 of the noncontact portion of internal surface side, and the maximum value thereof is a maximum value when the length w2 of the noncontact portion of internal surface side is determined for each predetermined angle. The radial length of the external surface side region of the noncontact portion when abutted together according to the above described (h) is the length w1 of the noncontact portion of external surface side, and the maximum value thereof is a maximum value when the length w1 of the noncontact portion of external surface side is determined for each predetermined angle.

The items of the above described (a) to (c) are calculated by using the profile data indicating the internal surface geometry at an end portion of the first steel pipe and the profile data indicating the internal surface geometry at an end portion of the second steel pipe, and the profile data indicating the external surface geometry at an end portion of the first steel pipe and the profile data indicating the external surface geometry at an end portion of the second steel pipe. Moreover, the items of the above described (d) to (f) are calculated by using the profile data indicating the internal surface geometry at an end portion of the first steel pipe and the profile data indicating the internal surface geometry at an end portion of the second steel pipe. The items of the above described (g) to (i) are calculated by using the profile data indicating the external surface geometry of an end portion of the first steel pipe and the profile data indicating the external surface geometry at an end portion of the second steel pipe.

By thus calculating the misalignment amount by using the profile data of an end portion of a steel pipe, it is possible to quantify and evaluate the misalignment. Therefore, upon butt welding end portions of steel pipes in the production of jointed pipes, calculating and evaluating the misalignment amount by using the misalignment calculation system of the present invention will make it possible to grasp the risk of failure in a resulting jointed pipe.

2. Angle Calculator

The misalignment calculation system of the present invention preferably further includes an angle calculator for determining angle data which minimize the misalignment amount. As a result of this, in butt welding of end portions of steel pipes in the production of jointed pipes, determining angle data which minimize the misalignment amount by using the misalignment calculation system of the present invention and adjusting the angle between the first and second steel pipes based on the determined angle data will allow the minimization of misalignment. Consequently, it becomes possible to reduce the risk of failure at an abutted part in a jointed pipe which is fabricated by butt welding of end portions of steel pipes.

In an embodiment in which the centers of external surface geometries are aligned and an embodiment in which the centers of internal surface geometries are aligned, the angle calculator calculates misalignment amounts at each input angle that is varied by a predetermined amount of change by using the misalignment calculator to determine an angle (angle formed by a first angle datum and a second angle datum) at which the misalignment amount becomes minimum. In such occasion, it is preferable that the angle calculator outputs an angle at which the misalignment amount becomes minimum as well as a misalignment amount at the angle thus output. Moreover, the angular interval at which the misalignment amount is calculated can be set at, for example, the same angle as the angle interval between adjacent measurement points in profile data.

In an embodiment in which the bottom positions of external surface geometries are aligned, the angle calculator calculates misalignment amounts by using the misalignment calculator to determine a first and second angles at which the misalignment amount becomes minimum while varying (increasing or decreasing) the first angle by a predetermined third angle each time, and also varying (increasing or decreasing) a second angle by a predetermined fourth angle each time with respect to each varied angle of the first angle. In this occasion, the angle calculator preferably outputs the first and second angles at which the misalignment amount becomes minimum, as well as misalignment amounts at the first and second angles thus output. Moreover, the angle intervals at which the misalignment amount is calculated, that is, the predetermined third angle and predetermined fourth angle can be set to the same angle as the angle interval between adjacent measurement points in profile data.

3. Computation of Order, Orientation and Angles of Steel Pipes

Next, a system, which is an embodiment of the misalignment calculation system of the present invention, for computing order of arrangement, pipe-end orientation, and angle data of steel pipes at which the total of the misalignment amounts becomes minimum when a group of steel pipes are made into jointed pipes will be described with reference to the FIG. 3.

FIG. 3 is a flowchart representing a processing example of a system, which shows an embodiment of the misalignment calculation system of the present invention, for computing order of arrangement, pipe-end orientation, and angles of steel pipes to minimize the total of the misalignment amounts in jointed pipes, in which FIG. 3(a) shows a main routine, and FIG. 3(b) shows a summing calculator. Reference characters S1 to S17 and S21 to S24 in the drawing represent processing steps.

Here, in the processing example shown in FIG. 3, it is supposed to compute the order, the orientation and angles of steel pipes which minimize the total of the misalignment amounts in a group of i lengths of steel pipes. These i lengths of steel pipes are assigned with index numbers 1 to i with an index number 1 being assigned to one pipe end and an index number 2 to the opposite pipe end in each steel pipe. Further, in the present description, it is supposed that the misalignment calculator calculates the misalignment amount with the centers of external surface geometries being aligned to each other, and the angle calculator calculates misalignment amounts at every angle of 1° to determine an angle at which the misalignment amount becomes minimum (the angle formed by a first angle datum and a second angle datum) as the angle data.

In the main processing shown in FIG. 3(a), first, misalignment data groups are produced by a data generator performing the processing to determine the angle (angle data) at which misalignment amount becomes minimum and the misalignment amount at that angle (angle data) by using an angle calculator for all the combinations when selecting two steel pipes from a group of steel pipes to make them abutted. In the processing example shown in FIG. 3, steps S1 to S10 correspond to the data generator. In the data generator, the processing by the angle calculator S5 and the processing S6 to store the results thereof in a misalignment data group are repeatedly performed. The repetition is performed by varying: a variable j indicating the index number of the steel pipe selected as the first steel pipe in a range of 1 to i−1; a variable k indicating the index number of the steel pipe selected as the second steel pipe in a range of j+1 to i; a variable l indicating the index number of the abutted end portion of the first steel pipe in a range of 1 or 2; and a variable m indicating the index number of the abutted end portion of the second steel pipe in a range of 1 or 2.

Such repetitive calculation generates misalignment data groups (for example, a table and an array). When a table is produced, the column of the table can be made up of: for example, the index number of the steel pipe selected as the first steel pipe and the index number of the end portion to be abutted of the first steel pipe; the index number of the steel pipe selected as the second steel pipe and the index number of the end portion to be abutted of the second steel pipe; and the angle (angle data) at which the misalignment becomes minimum and the misalignment amount at that angle (angle data). The number of columns to be produced will be $\{i \times (i-1)/2\} \times 4$.

Next, the orientation, the order, and angles (angle data) of steel pipes at which the total of misalignment amounts becomes minimum are determined by a computing unit. This processing by the data computing unit corresponds to steps S11 to S17 in the processing example shown in FIG. 3. The processing by the data computing unit is made up of the processing S11 to determine the order of arrangement, and the processing S12 to S17 to determine the condition at which the total of misalignment amounts becomes minimum by using the data of the order of arrangement.

In the processing S11, all the combinations of the order and orientation for steel pipes when performing butt welding are determined and stored in the data of the order of arrangement (for example, a table or an array). When the arrangement order data are stored as a table, the column of the arrangement order is made up of: for example, the index number of the steel pipe to be placed in the first place, the index number of the pipe end to be placed on the rear side in the first steel pipe, the number of the steel pipe to be placed in the second place, the index number of the pipe end to be placed on the rear side in the second steel pipe, . . . , the number of the steel pipe to be placed in i-th place, and the index number of the pipe end to be placed on the rear side in the i-th steel pipe. The number of rows in the resulting arrangement order table will be $i! \times 2^{(i-1)}$. Here, the pipe end to be placed on the rear side is the pipe end, which is to be butted to an end portion of the steel pipe to be placed in the (p+1)th place, of the end portions of the steel pipe to be placed in the p-th place (where, p is an integer of 1 to i−1), or an end portion, in which butt welding is not performed, of the end portions of the steel pipe to be placed in the i-th place.

Next, in the processing S12 to S16, the processing S13 to determine the total of the misalignment amounts, and the processing S14 to S15 to store the row number of the arrangement order table and the total values of the misalignment amounts when the total of misalignment amounts is minimum are repeated for each row of the arrangement order table by a summing calculator. As a result of this, the row number at which the total of misalignment amounts becomes minimum, and the total of the misalignment amounts are determined. Reading data from the arrangement order table by using the row number at which the total of determined misalignment amounts becomes minimum makes it possible to obtain the order of selecting and the pipe-end orientation of the steel pipe in which the misalignment amount becomes minimum. The angle (angle data) at which the misalignment amount becomes minimum is read successively from the misalignment data group by using the order thus obtained and pipe-end orientation of the steel pipe and is added. Then, thus determined order, orientation, and angle (angle data) of the steel pipe at which the total of misalignment amounts becomes minimum are output (S17).

On the other hand, as shown in FIG. 3(b), the summing calculator performs the processing S22 to retrieve the minimum misalignment amount upon making the steel pipe to be placed in the o-th place and the steel pipe to be placed in the (o+1)th place butted to each other by consulting a misalignment data group, and the processing S23 to add up to the total of misalignment amounts. In the processing S22 to retrieve a minimum misalignment amount, for example, the index number of the steel pipe to be placed in the o-th place; the index number of the end portion, which is to be abutted to the steel pipe to be placed in the (o+1)th place, of the steel pipe to be placed in the o-th place; the index number of the steel pipe to be placed in the (o+1)th place, and the index number of the end portion, which is to be abutted to the steel pipe to be placed in the o-th place, of the steel pipe to be placed in the (o+1)th place are obtained by using the order arrangement table. By inquiring the misalignment data group by using those as the search condition, it is possible to retrieve a minimum misalignment amount.

Further, in the processing S23 to add to the total of misalignment amounts, the retrieved minimum misalignment amount is added to a variable indicating the total of misalignment amounts. By performing these processing for o from 1 to i−1 in order, the total of misalignment amounts is calculated.

Thus, by being provided with the data generator, the summing calculator, and the computing unit, the misalignment calculation system of the present invention can determine the order, orientation, and angle data of steel pipes at which the total of misalignment amounts becomes minimum when butting a group of steel pipes one after another into a jointed pipe. Therefore, determining the order, orientation and angle data of steel pipes at which the total of misalignment amounts becomes minimum by using the misalignment calculation system of the present invention upon producing a jointed pipe from a group of steel pipes and, based on the result thereof, performing butt welding with the adjustment of the order, orientation and angle of steel pipes will make it possible to minimize the misalignment and the risk of failure of a resulting jointed pipe.

4. Judging Unit

On the other hand, the misalignment calculation system of the present invention may adopt a configuration including the above described misalignment calculator, and a judging unit that judges pass or fail by using a threshold value set for the misalignment amount calculated by using the misalignment calculator. This will allows the misalignment amount to be kept not higher than the threshold value with ease when performing butt welding. Therefore, in the production of jointed pipes, judging the misalignment amount by using the misalignment calculation system of the present invention upon butt welding end portions of steel pipes together and thereby adjusting the first and second steel pipes to have an angle at which the misalignment amount becomes not more than the threshold value will make it possible to improve the quality of resulting jointed pipes. The threshold value can be appropriately set depending on the items calculated as the misalignment amount, the size of steel pipe, the resistance to weld zone breakage required for the jointed pipe.

The so far described misalignment calculation system of the present invention can be realized by, for example, a program for performing the above described processing, and a computer. The computer can be made up of a data input section (for example, a keyboard and a mouse), a data processing section (a CPU and a memory, etc.) to which the data input section is connected, a data storage section (a large scale memory) connected with the data processing section, and a processing result display section (a monitor display) connected with the data processing section.

INDUSTRIAL APPLICABILITY

The misalignment calculation system of the present invention has the following remarkable advantages.

(1) It is possible to quantify and evaluate the misalignment occurring when performing butt welding of end portions of steel pipes, and (2) It is possible to determine an angle at which the misalignment becomes minimum according to the above described (1).

Using such a misalignment calculation system of the present invention in the production of jointed pipes makes it possible to reduce the risk of failure in resulting jointed pipes, thereby greatly contributing to the improvement of the quality of the jointed pipes.

REFERENCE SIGNS LIST

11: Pictorial figure that represents external surface geometry of first steel pipe
11c: Center of external surface geometry of first steel pipe
12: Pictorial figure that represents internal surface geometry of first steel pipe
13: External surface side noncontact region of first steel pipe
14: Internal surface side noncontact region of first steel pipe
21: Pictorial figure that represents external surface geometry of second steel pipe
21c: Center of external surface geometry of second steel pipe
22: Pictorial figure that represents internal surface geometry of second steel pipe
23: External surface side noncontact region of second steel pipe
24: Internal surface side noncontact region of second steel pipe
31: Measurement points for profile data
w1: Length of noncontact portion of external surface side
w2: Length of noncontact portion of internal surface side

What is claimed is:

1. A method of butt welding end portions of steel pipes together comprising:
   a) providing a misalignment calculation system, the misalignment calculation system further comprising:
   a misalignment calculator for calculating a misalignment amount occurring in butt welding of end portions of a first steel pipe and a second steel pipe by using profile data measured in a circumferential direction on the end portion of the first steel pipe by presetting a first angle datum, and profile data measured in a circumferential direction on the end portion of the second steel pipe by presetting a second angle datum, and
   a shape measurement instrument for measuring the profile data,
   wherein the misalignment calculator calculates the misalignment amount in a state in which an angle formed between the first angle datum and the second angle datum is adjusted to an input angle, and in which a center of the profile data showing an external surface geometry at the end portion of the first steel pipe is aligned with a center of the profile data showing an external surface geometry at the end portion of the second steel pipe; and
   wherein the misalignment calculation system further comprises an angle calculator for calculating a misalignment amount at each input angle that is varied by a predetermined amount of change by using the misalignment calculator, and determining an angle at which the misalignment amount becomes minimum,
   the misalignment calculation system further comprising:
   a data generator that generates a misalignment data group to determine angle data at which the misalignment amount becomes minimum and the misalignment amount at that angle data by using the angle calculator for all combinations when selecting two steel pipes from a group consisting of a plurality of steel pipes to make the two steel pipes abutted;
   a summing calculator for calculating a total value of each misalignment amount for each abutted part when abutting the plurality of steel pipes in order of input for calculation and in pipe-end orientation by using the misalignment data group; and
   a computing unit that calculates the total of the misalignment amounts by using the summing calculator for all the combinations of the order and the orientation when abutting steel pipes in the group one after another to form jointed pipes and determines the order, the orientation and the angle data at which the total of the misalignment amounts becomes minimum,
   b) selecting two steel pipes from the plurality of steel pipes based on the determination of the order, the orientation, and the angle data from the computing unit; and c) performing a butt welding step of end portions of the two selected steel pipes;

wherein using the calculated minimum misalignment amount as part of butt welding of end portions of abutted steel pipes minimizes fracture in the weld zone.

2. The method according to claim 1, wherein the misalignment amount is calculated by using the profile data indicating the internal surface geometry at an end portion of the first steel pipe and the profile data indicating the internal surface geometry at an end portion of the second steel pipe, and the profile data indicating the external surface geometry of an end portion of the first steel pipe and the profile data indicating the external surface geometry of an end portion of the second steel pipe, and the misalignment amount is one of the items according to the following (a), (b), and (c):

(a) an area of a noncontact portion when abutted together, (b) a maximum value of a radial length of the noncontact portion when abutted together, and (c) a proportion occupied by the area of a noncontact portion when abutted together with respect to the area of an end portion of the first steel pipe or an end portion of the second steel pipe.

3. The method according to claim 1, wherein the misalignment amount is calculated by using the profile data indicating the internal surface geometry of an end portion of the first steel pipe and the profile data indicating the internal surface geometry of an end portion of the second steel pipe, and is one of the items according to the following (d), (e), and (f):

(d) an area of an internal surface side region of the noncontact portion when abutted together, (e) a maximum value of the radial length of the internal surface side region of the noncontact portion when abutted together, and (f) a proportion occupied by the area of an internal surface side region of the noncontact portion when abutted together with respect to the area of an end portion of the first steel pipe or an end portion of the second steel pipe.

4. The method according to claim 1, wherein the misalignment amount is calculated by using profile data indicating the external surface geometry of an end portion of the first steel pipe and profile data indicating the external surface geometry of an end portion of the second steel pipe, and is one of the items according to the following (g), (h), and (i):

(g) an area of an external surface side region of the noncontact portion when abutted together, (h) a maximum value of the radial length of the external surface side region of the noncontact portion when abutted together, and (i) a proportion occupied by the area of an external surface side region of the noncontact portion when abutted together with respect to the area of an end portion of the first steel pipe or an end portion of the second steel pipe.

5. The method according to claim 1, wherein the method provides a judging unit that judges pass or fail by using a threshold value set for the misalignment amount calculated by using the misalignment calculator.

6. A method of butt welding end portions of steel pipes together comprising:

a) providing a misalignment calculation system, the misalignment calculation system further comprising:

a misalignment calculator for calculating a misalignment amount occurring in butt welding of end portions of a first steel pipe and a second steel pipe by using profile data measured in a circumferential direction on the end portion of the first steel pipe by presetting a first angle datum, and profile data measured in a circumferential direction on the end portion of the second steel pipe by presetting a second angle datum, and a shape measurement instrument for measuring the profile data, wherein the misalignment calculator calculates the misalignment amount in a state in which an angle formed between the first angle datum and the second angle datum is adjusted to an input angle, and in which a center of the profile data showing an internal surface geometry at the end portion of the first steel pipe is aligned with a center of the profile data showing an internal surface geometry at the end portion of the second steel pipe, and wherein the misalignment calculation system further comprises an angle calculator for calculating a misalignment amount at each input angle that is varied by a predetermined amount of change by using the misalignment calculator, and determining an angle at which the misalignment amount becomes minimum, the misalignment calculation system further comprising:

a data generator that generates a misalignment data group to determine angle data at which the misalignment amount becomes minimum and the misalignment amount at that angle data by using the angle calculator for all combinations when selecting two steel pipes from a group consisting of a plurality of steel pipes to make the two steel pipes abutted;

a summing calculator for calculating a total value of each misalignment amount for each abutted part when abutting the plurality of steel pipes in order of input for calculation and in pipe-end orientation by using the misalignment data group; and a computing unit that calculates the total of the misalignment amounts by using the summing calculator for all the combinations of the order and the orientation when abutting steel pipes in the group one after another to form jointed pipes and determines the order, the orientation and the angle data at which the total of the misalignment amounts becomes minimum, b) selecting two steel pipes from the plurality of steel pipes based on the determination of the order, the orientation, and the angle data from the computing unit; and c) performing a butt welding step of end portions of the two selected steel pipes;

wherein using the calculated minimum misalignment amount as part of butt welding of end portions of abutted steel pipes minimizes fracture in the weld zone.

7. The method according to claim 6, wherein the misalignment amount is calculated by using the profile data indicating the internal surface geometry at an end portion of the first steel pipe and the profile data indicating the internal surface geometry at an end portion of the second steel pipe, and the profile data indicating the external surface geometry of an end portion of the first steel pipe and the profile data indicating the external surface geometry of an end portion of the second steel pipe, and the misalignment amount is one of the items according to the following (a), (b), and (c):

(a) an area of a noncontact portion when abutted together, (b) a maximum value of a radial length of the noncontact portion when abutted together, and
(c) a proportion occupied by the area of a noncontact portion when abutted together with respect to the area of an end portion of the first steel pipe or an end portion of the second steel pipe.

8. The method according to claim 6, wherein
the misalignment amount is calculated by using the profile data indicating the internal surface geometry of an end portion of the first steel pipe and the profile data indicating the internal surface geometry of an end portion of the second steel pipe, and is one of the items according to the following (d), (e), and (f):
(d) an area of an internal surface side region of the noncontact portion when abutted together,
(e) a maximum value of the radial length of the internal surface side region of the noncontact portion when abutted together, and
(f) a proportion occupied by the area of an internal surface side region of the noncontact portion when abutted together with respect to the area of an end portion of the first steel pipe or an end portion of the second steel pipe.

9. The method according to claim 6, wherein
the misalignment amount is calculated by using profile data indicating the external surface geometry of an end portion of the first steel pipe and profile data indicating the external surface geometry of an end portion of the second steel pipe, and is one of the items according to the following (g), (h), and (i):
(g) an area of an external surface side region of the noncontact portion when abutted together,
(h) a maximum value of the radial length of the external surface side region of the noncontact portion when abutted together, and
(i) a proportion occupied by the area of an external surface side region of the noncontact portion when abutted together with respect to the area of an end portion of the first steel pipe or an end portion of the second steel pipe.

10. The method according to claim 6, wherein the method provides
a judging unit that judges pass or fail by using a threshold value set for the misalignment amount calculated by using the misalignment calculator.

11. A method of butt welding end portions of steel pipes together comprising:
a) providing a misalignment calculation system, the misalignment calculation system further comprising:
a misalignment calculator for calculating a misalignment amount occurring in butt welding of end portions of a first steel pipe and a second steel pipe by using profile data measured in a circumferential direction on the end portion of the first steel pipe by presetting a first angle datum, and profile data measured in a circumferential direction on the end portion of the second steel pipe by presetting a second angle datum, and
a shape measurement instrument for measuring the profile data,
wherein the misalignment calculator calculates the misalignment amount in a state in which the profile data of the end portion of the first steel pipe is rotated by a first angle as input and the profile data of the end portion of the second steel pipe is rotated by a second angle as input, and in which a bottom position of the profile data showing an external surface geometry at the end portion of the first steel pipe is aligned with a bottom position of the profile data showing an external surface geometry at the end portion of the second steel pipe; and
wherein the misalignment calculation system further comprises an angle calculator that varies the first angle by a predetermined third angle each time, while varying the second angle by a predetermined fourth angle each time at each first angle thus varied, and calculates the misalignment amount at each change of angle by using the misalignment calculator, to determine the first angle and the second angle at which the misalignment amount becomes minimum,
the misalignment calculation system further comprising:
a data generator that generates a misalignment data group to determine angle data at which the misalignment amount becomes minimum and the misalignment amount at that angle data by using the angle calculator for all combinations when selecting two steel pipes from a group consisting of a plurality of steel pipes to make the two steel pipes abutted;
a summing calculator for calculating a total value of each misalignment amount for each abutted part when abutting the plurality of steel pipes in order of input for calculation and in pipe-end orientation by using the misalignment data group; and
a computing unit that calculates the total of the misalignment amounts by using the summing calculator for all the combinations of the order and the orientation when abutting steel pipes in the group one after another to form jointed pipes and determines the order, the orientation and the angle data at which the total of the misalignment amounts becomes minimum,
b) selecting two steel pipes from the plurality of steel pipes based on the determination of the order, the orientation, and the angle data from the computing unit; and
c) performing a butt welding step of end portions of the two selected steel pipes;
wherein using the calculated minimum misalignment amount as part of butt welding of end portions of abutted steel pipes minimizes fracture in the weld zone.

12. The method according to claim 11, wherein
the misalignment amount is calculated by using the profile data indicating the internal surface geometry at an end portion of the first steel pipe and the profile data indicating the internal surface geometry at an end portion of the second steel pipe, and the profile data indicating the external surface geometry of an end portion of the first steel pipe and the profile data indicating the external surface geometry of an end portion of the second steel pipe, and
the misalignment amount is one of the items according to the following (a), (b), and (c):
(a) an area of a noncontact portion when abutted together,
(b) a maximum value of a radial length of the noncontact portion when abutted together, and
(c) a proportion occupied by the area of a noncontact portion when abutted together with respect to the area of an end portion of the first steel pipe or an end portion of the second steel pipe.

13. The method according to claim 11, wherein
the misalignment amount is calculated by using the profile data indicating the internal surface geometry of an end portion of the first steel pipe and the profile data indicating the internal surface geometry of an end portion of the second steel pipe, and is one of the items according to the following (d), (e), and (f):

(d) an area of an internal surface side region of the noncontact portion when abutted together,
(e) a maximum value of the radial length of the internal surface side region of the noncontact portion when abutted together, and
(f) a proportion occupied by the area of an internal surface side region of the noncontact portion when abutted together with respect to the area of an end portion of the first steel pipe or an end portion of the second steel pipe.

14. The method according to claim 11, wherein
the misalignment amount is calculated by using profile data indicating the external surface geometry of an end portion of the first steel pipe and profile data indicating the external surface geometry of an end portion of the second steel pipe, and is one of the items according to the following (g), (h), and (i):
(g) an area of an external surface side region of the noncontact portion when abutted together,
(h) a maximum value of the radial length of the external surface side region of the noncontact portion when abutted together, and
(i) a proportion occupied by the area of an external surface side region of the noncontact portion when abutted together with respect to the area of an end portion of the first steel pipe or an end portion of the second steel pipe.

* * * * *